Patented Nov. 8, 1932

1,887,175

UNITED STATES PATENT OFFICE

EINAR WOXVOLD, OF CHICAGO, ILLINOIS, ASSIGNOR TO AMERICAN MAIZE PRODUCTS COMPANY, A CORPORATION OF MAINE

COMPOSITION FOR BAKING PURPOSES

No Drawing. Application filed November 1, 1928. Serial No. 316,620.

The present invention relates to improvements in compositions more particularly intended for use in baking operations to improve the dough and to aid in the propagation of yeast therein, and to methods of preparing such compositions.

In preparing the composition of the present invention, I employ a carbohydrate, and preferably a monosaccharide, suitably of the character of dextrose. In the preparation of such compositions by methods hitherto in use, the inherent characteristics of the products have rendered them unavailable for convenient use or for commercial distribution. This has been largely due to the fact that such dextrose-containing compositions, upon exposure to the air, absorb water with the formation of taffy-like masses which are difficult and disagreeable to handle.

It has now been found that by the incorporation with the dextrose (preferably the hydrated form) of suitable proportions of calcium lactate, either acid or neutral, as hereinafter described, a composition is formed having physical characteristics not hitherto found in such compositions including dextrose. The composition is homogeneous and uniform; its physical characteristics are not effected by ordinary atmospheric moisture; and the constituents of the mixture cooperate in improving a dough to which the composition is added and in accelerating the propagation of yeast therein.

In preparing the composition of the present invention, an aqueous solution is formed containing dextrose and the desired calcium lactate material, either normal or acid, the proportion of dextrose in the solids in the solution suitably varying from 1 to 50%. In general, however, it is preferred that the proportion of dextrose present be from 13 to 35%. The solution is prepared to contain 40 to 60% solids and then rapidly desiccated at a high temperature, for example, by spray drying. In a suitable operation for this purpose, the outlet gases from the spray drier proper may have a temperature of 80 to 200° F., the hot gases employed having a temperature of 350 to 375° F. It is readily apparent that other rapid drying methods may be employed, and that the concentration of the solution subjected to desiccation may be varied within wide limits.

As stated hereinbefore, either the neutral or the acid calcium lactate may be employed, and in the latter case, the proportion of acid lactate is varied to give a desired acidity in dilute solutions. Thus, in using the acid lactate in compositions in the range of proportions hereinbefore set forth, the pH of a 5% solution of the composition will vary from 6.1 to 3.1.

By operating in the manner described, a dry composition is obtained containing dextrose and calcium lactate in thin bodies, having the form of spherical shells or sections thereof in the event of the use of a spray drier, which are homogeneous and uniform in character and which do not have a high susceptibility to atmospheric moisture changes. Where other methods of drying are employed the products may have the form of flakes or thin, flat shells. The material has physical characteristics substantially those of a solid solution or glass (that is, it is amorphous) and does not readily cake or form semi-liquid or sticky plastic masses when access to the air is permitted.

Substantial proportions of starch, may be incorporated in the material by dissolving dextrose and calcium lactate (acid or neutral) in a starch paste or slurry of suspended starch, which is then subjected to drying as hereinbefore set forth. Under these circumstances the homogeneous mass or solid solution of the dextrose and calcium lactate appears to incorporate the starch particles without substantial change in form and while retaining the desirable characteristics of the mixture.

I claim:

1. As an article of manufacture, thin, shell-like particles of a homogeneous body comprising dextrose and acid calcium lactate, the proportions of the latter being such that a 5% solution of the material has a pH of 6.1 to 3.1.

2. The method of forming a homogeneous body containing dextrose and calcium lactate in solid solution comprises forming a solution containing dextrose and calcium lactate, the former comprising 1 to 50% of the total solids therein, and rapidly drying the mixture in the form of thin discrete particles.

3. The method of forming a homogeneous body of non-hygroscopic character containing dextrose and calcium lactate in solid solution which comprises forming a solution containing 40 to 60% of solids including dextrose and calcium lactate, the former comprising 1 to 50% of the total solids therein, and spray drying the solution.

4. The method of forming a homogeneous body containing dextrose and calcium lactate in solid solution comprising forming a solution containing dextrose and acid calcium lactate, the former comprising less than 50% of the total solids therein, and rapidly drying the mixture.

In testimony whereof I have hereunto set my hand and seal this 29 day of October, 1928.

EINAR WOXVOLD.